US006443128B1

(12) United States Patent
Pursifull et al.

(10) Patent No.: US 6,443,128 B1
(45) Date of Patent: Sep. 3, 2002

(54) METHOD OF CONTROLLING AN INTERNAL COMBUSTION ENGINE

(75) Inventors: Ross Dykstra Pursifull, Dearborn; Thomas Raymond Cultbertson, Livonia, both of MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/887,774

(22) Filed: Jun. 22, 2001

(51) Int. Cl.[7] ................................................. F02D 9/00

(52) U.S. Cl. ...................................... 123/399; 123/396

(58) Field of Search ................................ 123/399, 396, 123/395, 398, 400, 403; 701/114

(56) References Cited

U.S. PATENT DOCUMENTS

| 5,233,958 A | * | 8/1993 | Knoss et al. ................. 123/396 |
| 6,073,610 A | * | 6/2000 | Matsumoto et al. ........ 123/396 |
| 6,230,094 B1 | * | 5/2001 | Ohashi ........................ 701/107 |

* cited by examiner

*Primary Examiner*—Bibhu Mohanty
(74) *Attorney, Agent, or Firm*—John E. Kajander

(57) ABSTRACT

A method of controlling an internal combustion engine is provided. The engine has an engine controller and an electronically controlled throttle including a throttle control motor driven by a throttle control circuit. The method includes detecting an open circuit condition in the throttle control circuit and then detecting a closed circuit condition. After detection of the closed circuit condition, the throttle position command is clipped and the clipped throttle position is applied to the throttle control motor.

15 Claims, 3 Drawing Sheets

METHOD OF CONTROLLING AN INTERNAL COMBUSTION ENGINE

BACKGROUND OF THE INVENTION

1. Field of the Invention

The present invention relates to an internal combustion engine having an engine controller and an electronically controlled throttle including a throttle control motor driven by a throttle control circuit.

2. Background Art

An internal combustion engine includes a plurality of cylinders. Each cylinder has an intake and an exhaust and corresponding intake and exhaust valves. A piston is received in each cylinder, and in a spark ignition type engine, a spark plug is also present at each cylinder. In the combustion chamber of a cylinder, a mixture of air and fuel is detonated to drive the engine. The fuel is received in any of a number of known manners such as via injection into the incoming air stream through the intake.

Air flow through the intake manifold is controlled by a throttle including a throttle plate and a throttle actuator. A throttle position sensor senses a position of the throttle.

An engine controller controls various aspects of the engine including injection and spark timing. The controller also electronically controls the throttle plate by providing a signal to the throttle actuator. Typically, the controller provides the signals to the throttle actuator and receives a signal from the throttle position sensor to allow closed loop control of the throttle. The throttle position command sent to the throttle actuator from the controller is determined from, among other things, information received from a driver interface such as fueling demand.

Conventional electronically controlled throttle systems and associated methods have been used in many applications that are commercially successful. However, in certain situations, it may be possible that the throttle actuator, which typically includes a throttle control motor and throttle motor circuit, momentarily does not respond. That is, a momentary open circuit could occur somewhere in the throttle motor circuit causing the throttle to go to a default position because it is unpowered. In such a situation, an existing electronically controlled throttle could respond very quickly when the momentary motor open circuit lapses and the circuit is then again closed. The quick response of the electronically controlled throttle after the momentary motor open circuit may be undesirable in certain situations. For the foregoing reasons, there is a need for a method of controlling an internal combustion engine having an electronically controlled throttle wherein throttle control after a momentary open circuit is precisely controlled so as to reduce the possibility for undesirable abrupt throttle plate position changes.

SUMMARY OF THE INVENTION

It is, therefore, an object of the present invention to provide a method of controlling an internal combustion engine having an electronically controlled throttle wherein after detection of a closed circuit condition following a momentary open circuit condition, the throttle position command is clipped and then applied to the throttle control motor, providing a smooth response to increased throttle demand after the momentary open circuit.

In carrying out the above object, a method of controlling an internal combustion engine is provided. The engine has an engine controller and an electronically controlled throttle including a throttle control motor driven by a throttle control circuit. The method comprises determining a throttle position command for the throttle control motor, and applying the throttle position command to the throttle control motor with the throttle control circuit. The method further comprises detecting an open circuit condition in the throttle control circuit, detecting a closed circuit condition in the throttle control circuit, and after detection of the closed circuit condition, clipping the throttle position command. The clipped throttle position command is applied to the throttle control motor with the throttle control circuit.

In a preferred embodiment, the electronically controlled throttle further includes a throttle position sensor. Detecting the open circuit condition further comprises determining an actual throttle position with the throttle position sensor, and comparing the throttle position command to the actual throttle position. The open circuit condition is detected based on the comparison. Further, in a preferred embodiment, the throttle has a nominal default position, an open stop position, and a close stop position. Detecting the open circuit condition based on the comparison further comprises determining a held against stop mode for the throttle based on the comparison. When the held against stop mode is present, the actual throttle position is stored as the open position when the present held against stop mode is a held against open stop mode. When the present held against stop mode is a held against close stop mode, the actual throttle position is stored as the close stop position. And, when the held against stop mode is present, the open circuit condition is detected when the actual throttle position is near the nominal default position and the actual throttle position is inappropriate for the present held against stop mode. Even further, in a preferred embodiment, detecting the closed circuit condition further comprises detecting the closed circuit condition when the actual throttle position is no longer near the nominal default position.

Further, in carrying out the invention, a system for controlling an internal combustion engine is provided. The system includes an engine controller and an electronically controlled throttle including a throttle control motor driven by a throttle control circuit. The system is configured to determine a throttle position command for the throttle control motor, and apply the throttle position command to the throttle control motor with the throttle control circuit. The system is further configured to detect an open circuit condition in the throttle control circuit, detect a closed circuit condition in the throttle control circuit, and after detection of the closed circuit condition, clip the throttle position command. The clipped throttle position command is applied to the throttle control motor with the throttle control circuit. In a preferred embodiment, other aspects of the preferred method may be incorporated.

Further, in carrying out the present invention, an internal combustion engine is provided. The engine has an engine controller and an electronically controlled throttle including a throttle control motor driven by a throttle control circuit. The engine is configured to determine a throttle position command for the throttle control motor, and apply the throttle position command to the throttle control motor with the throttle control circuit. The engine is further configured to detect an open circuit condition in the throttle control circuit, detect a closed circuit condition in the throttle control circuit, and after detection of the closed circuit condition, clip the throttle position command. The clipped throttle position command is applied to the throttle control motor with the throttle control circuit. In a preferred engine, other aspects of the preferred method may be incorporated.

The advantages associated with embodiments of the present invention are numerous. For example, should a momentary open circuit occur somewhere in the throttle motor circuit, the following scenario could take place. Throttle command is 20°. The motor open circuit occurs. Throttle goes to default (for example, 5°) because it is unpowered. The driver notices the reduced power, and steps into the accelerator petal. Throttle command goes to 80°. Low engine power continues. Then, the motor circuit closes. In a conventional electronically controlled throttle, a driver could be surprised by a quick power increase. In accordance with the present invention, the open circuit is detected, the subsequent closing of the circuit is detected, and the throttle position command is limited or clipped prior to application to the throttle control motor, resulting in smooth changing of the applied throttle position command.

The above object and other objects, features, and advantages of the present invention are readily apparent from the following detailed description of the preferred embodiment when taken in connection with the accompanying drawings.

DETAILED DESCRIPTION OF THE PREFERRED EMBODIMENT

Figure 1:
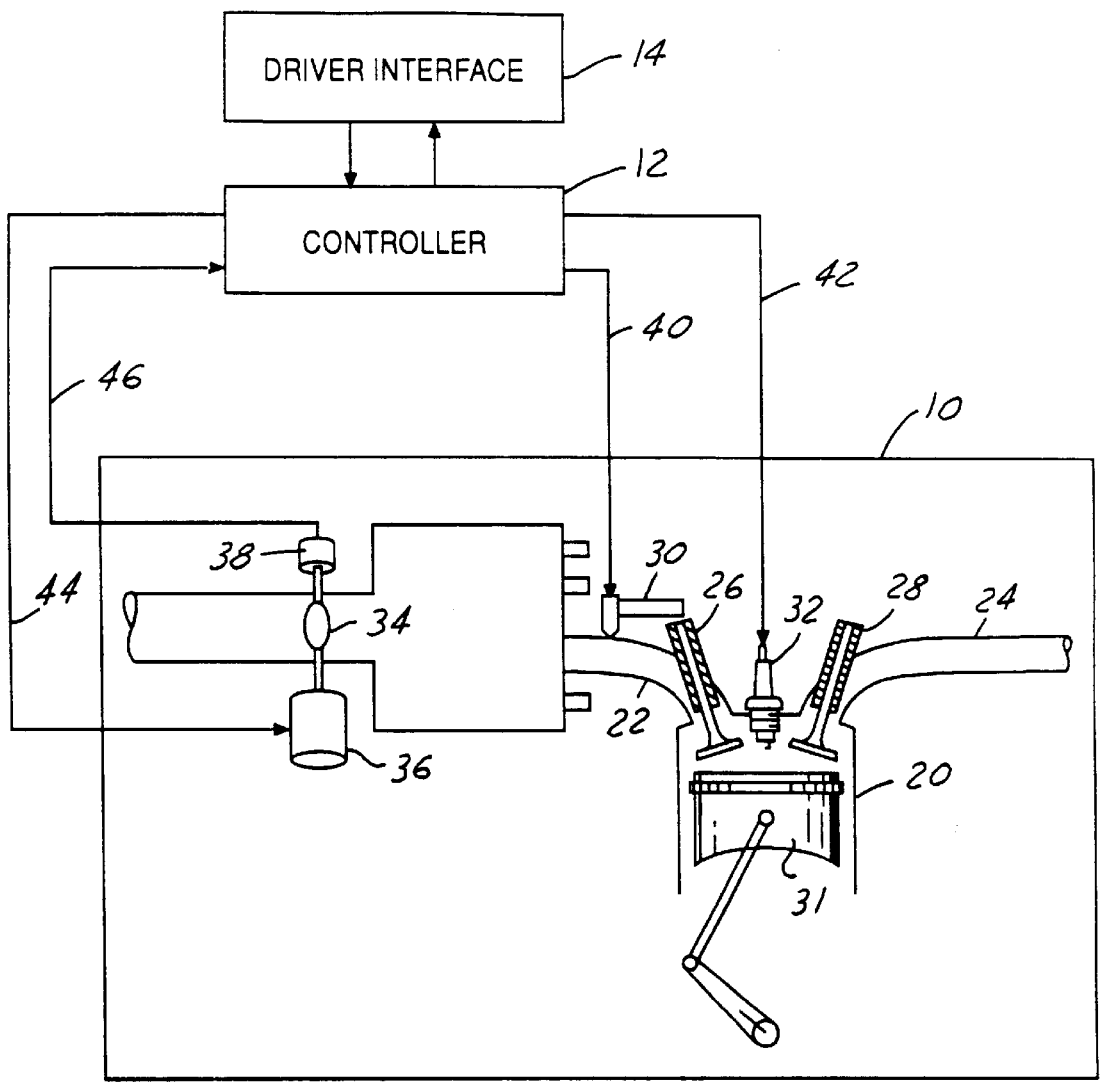
FIG. 1 is an internal combustion engine of the present invention, including an engine controller and an electronically controlled throttle.

Referring to FIG. 1, an engine 10 includes a plurality of cylinders 20, each cylinder 20 has an associated intake 22 and exhaust 24. Accordingly, engine 10 also includes an intake valve 26 and an exhaust valve 28 for each cylinder 20. Fueling may be controlled in any known manner such as via fuel injector 30 that injects fuel into the intake air stream. Spark plug 32 provides the spark to ignite the compressed air and fuel mixture to drive piston 31 during the power stroke.

An electronically controlled throttle includes throttle plate 34 which is driven by throttle motor 36. Throttle position sensor 38 measures the actual position of the throttle while throttle motor 36 drives throttle plate 34 in response to a throttle position command. Controller 12 is also considered to be a part of engine 10, and provides the throttle position command to throttle motor 36 as indicated at 44. Further, as indicated at 46, throttle position sensor 38 provides the actual throttle position to controller 12. Controller 12 also controls other aspects of engine operation including injection and spark timing as indicated at 40 and 42, respectively. In addition, controller 12 receives signals from driver interface 14 such as fueling demand.

Figure 2:
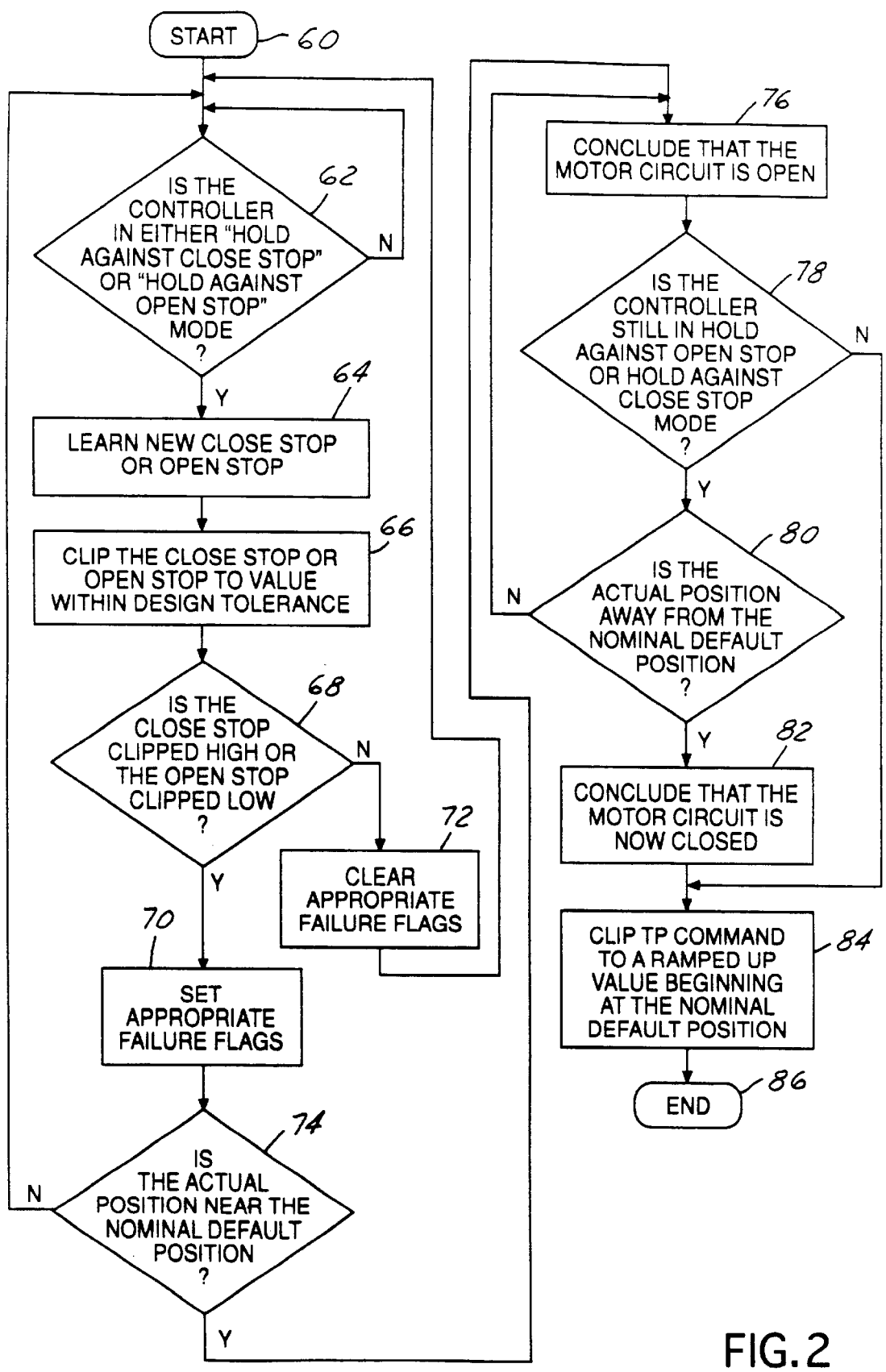
FIG. 2 is a flow chart illustrating a preferred method of the present invention.

In accordance with the present invention, the electronically controlled throttle is controlled by controller 12 in such a manner as to detect a momentary open circuit condition and the subsequent closed circuit condition and then clip the throttle position command prior to application to the throttle control motor 36. A preferred method of the present invention is illustrated in FIG. 2. Control passes from start block 60 to decision block 62. The controller has near continuous positional capability between the most closed position and the most open position for the throttle. Both the most closed position and the most open position are limited with a mechanical stop. If the throttle position command commands the throttle to or past either of these mechanical stops, or if the throttle plate encounters an obstruction, the controller enters special modes. These special modes are called hold against closed stop and hold against open stop. If there is an open circuit anywhere in the motor circuit, it appears to the controller as if there were an obstruction near the default position because the motor goes to the default position if is unpowered. At block 62, if the controller is not in either of the special modes, the algorithm returns to start block 60.

At block 64, because the throttle is being held against either the open or close stop (assuming no faults in the system), the throttle position sensor output corresponding to either of the stop positions is learned at this time. At block 66, however, should there be a fault in the system (for example, an obstruction) it is checked to see that the learned value is not an unreasonable value. That is, the learned throttle position sensor output corresponding to the stop position is clipped to within design tolerance at block 66.

If no clipping is necessary, meaning that the learned position is within the design tolerance, any failure flag that was set that indicated that a stop position was out of place is cleared (blocks 68 and 72). Then, the algorithm returns to start block 60. On the other hand, in the case where the learned throttle position sensor output value was clipped, a failure flag is set indicating that a stop position is out of place (blocks 68 and 70).

At block 74, it is known that either an obstruction exists because the stop is not at the expected location, or the motor circuit is open. To distinguish between these two cases, the actual position is examined. If the actual position is not near the nominal default position, it is concluded that an obstruction exists and the algorithm simply returns to start block 60. If the actual position is near the nominal default position, it is concluded that the motor circuit is open and control passes to block 76. At block 76, it is concluded that the motor circuit is open and any appropriate failure flags are set. At block 78, as long as the controller is still in one of these hold again stop modes, the logic continues to check to see if the actual position is still near default or not. At block 80, if the actual position is away from default, it is concluded that the motor circuit is now closed and control passes to block 82. At block 82, it is concluded that the motor circuit is now closed and the motor open failure flag is cleared, with flow proceeding to block 84.

To get to block 84, there was a situation where the motor circuit was open for a significant amount of time and now the motor circuit is closed because the throttle can be positioned somewhere besides default position. To allow the throttle to immediately respond to the throttle position command might result in more acceleration than the driver intends. In accordance with the present invention, the throttle position command is clipped to a ramped up value beginning at the nominal default position and the applied throttle position is slowly ramped up to the throttle command requested. Block 86 is the end of the control algorithm.

Figure 3:
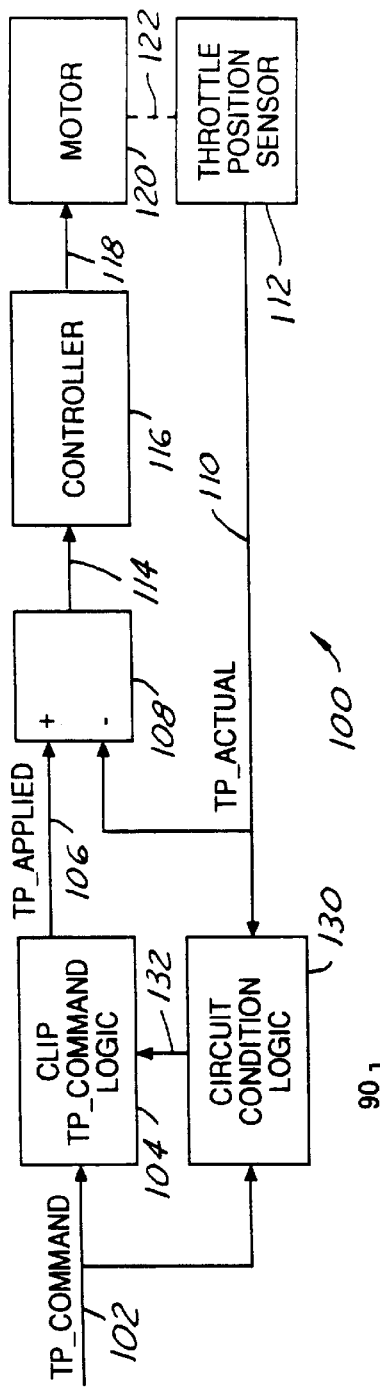
FIG. 3 is a control system of the present invention.

Although FIG. 2 illustrated a preferred method of the present invention in flow chart format, FIG. 3 illustrates a preferred embodiment of the present invention as a control system diagram at 100. Throttle position command 102 is received by throttle position command clipping logic 104, and the applied throttle position 106 enters summer 108. During normal operation, the applied throttle position 106 is the same as the throttle position command 102. In certain special circumstances, the applied throttle position 106 is a clipped version of throttle position command 102. Summer 108 also receives actual throttle position 110 as measured by throttle position sensor 112. Summer 108 determines an error signal 114 that is provided to controller 116. Controller 116 applies signal 118 to motor 120 to control the throttle plate. Circuit condition logic 130 monitors actual throttle position 110 and commanded throttle position 102, and provides output 132 to clipping logic 104 indicative of whether or not to clip the commanded throttle position. Operation of the control system 100 of FIG. 3 and method of FIG. 2 may be better understood with reference to the graph of FIG. 4.

Figure 4:
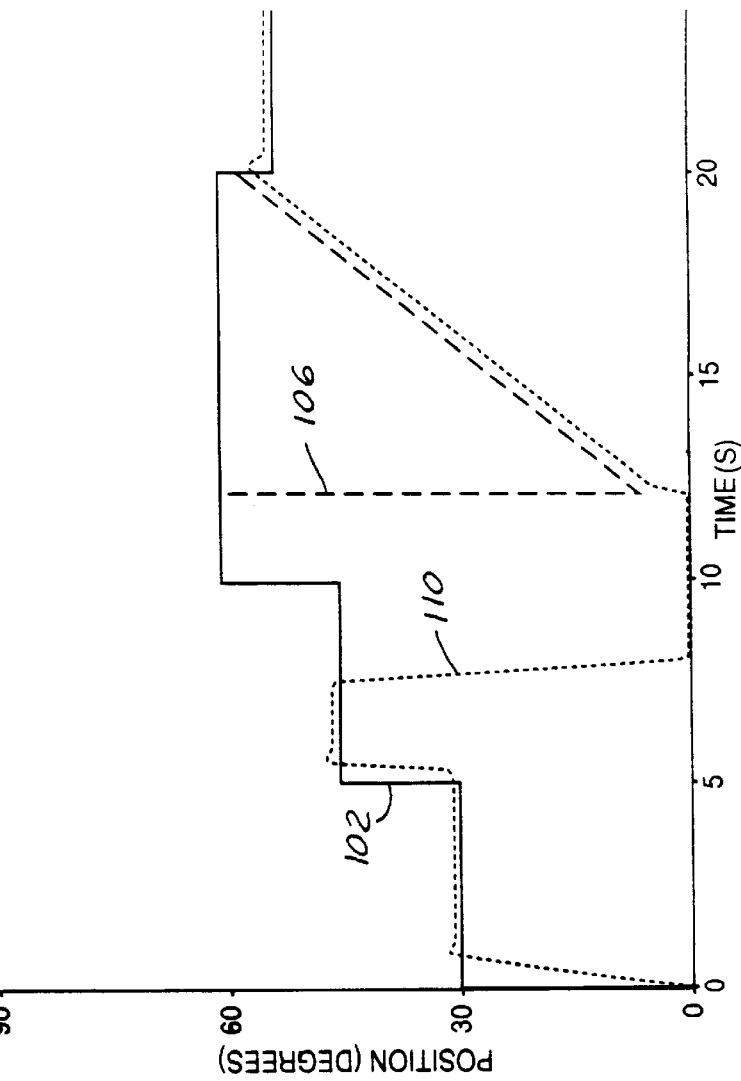
FIG. 4 is a graph illustrating operation of an electronically controlled throttle in accordance with the present invention.

In FIG. 4, throttle position command 102 is shown in solid line. Actual throttle position 110 is shown in short dashed line. Applied throttle position (which is sometimes equal to throttle position command 102 and is sometimes a clipped version of throttle position command 102 is shown in long dashed line at 106. That is, except for the region from about 12 to about 20 seconds, the applied throttle position is the same as the throttle position command 102.

As shown, at 0 seconds, the throttle position command changes from 0 to 30°. Actual throttle position 110 follows the command throttle position 102 in accordance with the feedback control illustrated in FIG. 3. At 5 seconds, throttle position command 102 is changed to 45°, and actual throttle position 110 follows. At about 8 seconds, there is a momentary open circuit. Throttle position command 102 remains at 45°, but actual throttle position 110 drops to the default value shown at about 0°. At about 10 seconds, the driver senses a loss of power and demands a higher value for throttle position command 102 (60°). Because the motor circuit is open, the actual throttle position 110 remains at the nominal default value. At about 12 seconds, the motor drive circuit closes. Actual throttle position 110 immediately begins to rise toward throttle position command 102. At that moment, circuit condition logic 130, by comparing actual throttle position 110 and commanded throttle position 102 determines that the applied throttle position 106 should be a clipped version of the commanded throttle position 102. As such, although throttle position command 102 remains at 60° up until 20 seconds, applied throttle position 106 is clipped and slowly ramps up until applied throttle position 106 meets commanded throttle position 102 at which point clipping is no longer necessary and applied throttle position 106 is again the same as commanded throttle position 102.

While the best mode for carrying out the invention has been described in detail, those familiar with the art to which this invention relates will recognize various alternative designs and embodiments for practicing the invention as defined by the following claims.

What is claimed:

1. A method of controlling an internal combustion engine, the engine having an engine controller and an electronically controlled throttle including a throttle control motor driven by a throttle control circuit, the method comprising:

determining a throttle position command for the throttle control motor;

applying the throttle position command to the throttle control motor with the throttle control circuit;

detecting an open circuit condition in the throttle control circuit;

detecting a closed circuit condition in the throttle control circuit;

after detection of the closed circuit condition, clipping the throttle position command; and applying the clipped throttle position command to the throttle control motor with the throttle control circuit.

2. The method of claim 1 wherein the electronically controlled throttle further includes a throttle position sensor, and wherein detecting the open circuit condition further comprises:

determining an actual throttle position with the throttle position sensor;

comparing the throttle position command to the actual throttle position; and detecting the open circuit condition based on the comparison.

3. The method of claim 2 wherein the throttle has a nominal default position, an open stop position, and a close stop position, and wherein detecting the open circuit condition based on the comparison further comprises:

determining a held against stop mode for the throttle based on the comparison;

when the held against stop mode is present, storing the actual throttle position as the open stop position when the present held against stop mode is a held against open stop mode, and storing the actual throttle position as the close stop position when the present held against stop mode is a held against close stop mode; and when the held against stop mode is present, detecting the open circuit condition when the actual throttle position is near the nominal default position and the actual throttle position is inappropriate for the present held against stop mode.

4. The method of claim 3 wherein detecting the closed circuit condition further comprises:

detecting the closed circuit condition when the actual throttle position is no longer near the nominal default position.

5. The method of claim 2 wherein detecting the closed circuit condition further comprises:

detecting the closed circuit condition when the actual throttle position is no longer near the nominal default position.

6. A system for controlling an internal combustion engine, the system including an engine controller and an electronically controlled throttle including a throttle control motor driven by a throttle control circuit, the system being configured to:

determine a throttle position command for the throttle control motor;

apply the throttle position command to the throttle control motor with the throttle control circuit;

detect an open circuit condition in the throttle control circuit;

detect a closed circuit condition in the throttle control circuit;

after detection of the closed circuit condition, clip the throttle position command; and apply the clipped throttle position command to the throttle control motor with the throttle control circuit.

7. The system of claim 6 wherein the electronically controlled throttle further includes a throttle position sensor, and wherein detecting the open circuit condition further comprises:

determining an actual throttle position with the throttle position sensor;

comparing the throttle position command to the actual throttle position; and detecting the open circuit condition based on the comparison.

8. The system of claim 7 wherein the throttle has a nominal default position, an open stop position, and a close stop position, and wherein detecting the open circuit condition based on the comparison further comprises:

determining a held against stop mode for the throttle based on the comparison;

when the held against stop mode is present, storing the actual throttle position as the open stop position when the present held against stop mode is a held against open stop mode, and storing the actual throttle position as the close stop position when the present held against stop mode is a held against close stop mode; and when the held against stop mode is present, detecting the open circuit condition when the actual throttle position is near the nominal default position and the actual throttle position is inappropriate for the present held against stop mode.

9. The system of claim 8 wherein detecting the closed circuit condition further comprises:

detecting the closed circuit condition when the actual throttle position is no longer near the nominal default position.

10. The system of claim 7 wherein detecting the closed circuit condition further comprises:

detecting the closed circuit condition when the actual throttle position is no longer near the nominal default position.

11. An internal combustion engine, the engine having an engine controller and an electronically controlled throttle including a throttle control motor driven by a throttle control circuit, the engine being configured to:

determine a throttle position command for the throttle control motor;

apply the throttle position command to the throttle control motor with the throttle control circuit;

detect an open circuit condition in the throttle control circuit;

detect a closed circuit condition in the throttle control circuit;

after detection of the closed circuit condition, clip the throttle position command; and apply the clipped throttle position command to the throttle control motor with the throttle control circuit.

12. The engine of claim 11 wherein the electronically controlled throttle further includes a throttle position sensor, and wherein detecting the open circuit condition further comprises:

determining an actual throttle position with the throttle position sensor;

comparing the throttle position command to the actual throttle position; and detecting the open circuit condition based on the comparison.

13. The engine of claim 12 wherein the throttle has a nominal default position, an open stop position, and a closed stop position, and wherein detecting the open circuit condition based on the comparison further comprises:

determining a held against stop mode for the throttle based on the comparison; and when the held against stop mode is present, storing the actual throttle position as the open stop position when the present held against stop mode is a held against open stop mode, and storing the actual throttle position as the close stop position when the present held against stop mode is the held against close stop mode; and when the held against stop mode is present, detecting the open circuit condition when the actual throttle position is near the nominal default position and the actual throttle position is inappropriate for the present held against stop mode.

14. The engine of claim 13 wherein detecting the closed circuit condition further comprises:

detecting the closed circuit condition when the actual throttle position is no longer near the nominal default position.

15. The engine of claim 12 wherein detecting the closed circuit condition further comprises:

detecting the closed circuit condition when the actual throttle position is no longer near the nominal default position.

* * * * *